(12) United States Patent
Hellman et al.

(10) Patent No.: US 11,917,123 B2
(45) Date of Patent: Feb. 27, 2024

(54) ANGULAR SPATIAL LIGHT MODULATOR MULTI-DISPLAY

(71) Applicant: Arizona Board of Regents on Behalf of the University of Arizona, Tucson, AZ (US)

(72) Inventors: Brandon Hellman, Tucson, AZ (US); Yuzuru Takashima, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 145 days.

(21) Appl. No.: 17/433,058

(22) PCT Filed: Feb. 21, 2020

(86) PCT No.: PCT/US2020/019251
§ 371 (c)(1),
(2) Date: Aug. 23, 2021

(87) PCT Pub. No.: WO2020/172545
PCT Pub. Date: Aug. 27, 2020

(65) Prior Publication Data
US 2022/0159235 A1 May 19, 2022

Related U.S. Application Data

(60) Provisional application No. 62/808,960, filed on Feb. 22, 2019.

(51) Int. Cl.
*G03B 21/00* (2006.01)
*H04N 13/365* (2018.01)
(Continued)

(52) U.S. Cl.
CPC ......... *H04N 13/365* (2018.05); *H04N 13/337* (2018.05); *H04N 13/363* (2018.05)

(58) Field of Classification Search
CPC .. G03B 21/005; G03B 21/008; G03B 21/208; H04N 13/365; H04N 13/302; G02B 26/0833; G02B 26/0808
See application file for complete search history.

(56) References Cited

U.S. PATENT DOCUMENTS

| 2004/0080938 A1 | 4/2004 | Holoman et al. |
| 2009/0168041 A1* | 7/2009 | Sawai ............... G02B 27/0994 355/71 |

(Continued)

FOREIGN PATENT DOCUMENTS

WO 2018191696 A1 10/2018

OTHER PUBLICATIONS

Ozdemir, A., et al. "Analysis of the focusing crosstalk effects of broadband all-dielectric planar metasurface microlends arrays for ultra-compact optical device applications" OSA Continuum Vo. 1, No. 2, pp. 506-520; Sep. 27, 2018 <DOI: 10.1364/OSAC.1. 000506>, entire document.

(Continued)

*Primary Examiner* — Ryan D Howard
(74) *Attorney, Agent, or Firm* — George R. McGuire

(57) ABSTRACT

A light projection system for projecting full-resolution, high quality images into different directions. The system includes a light source configured to provide a homogenous output beam of light and an illumination shaping optic elements configured with at least one of a predetermined cone angle, numerical aperture, and F-number. The system also includes a spatially-dependent, angular light modulator (ALM) with a plurality of pixels, each having an ON state, an OFF state, one input pupil, and N diffraction order pupils. The ALM is positioned such that the output beam is incident on the plurality of pixels. The at least one of the predetermined cone angle, numerical aperture, and F-number of the illumination shaping optic elements prevents contaminating (Continued)

light from entering an incorrect pupil. The system additionally includes a processor coupled to the ALM to provide discrete diffraction-based beam steering, whereby the ALM will project into one diffraction order at one time.

19 Claims, 18 Drawing Sheets

(51) Int. Cl.
*H04N 13/337* (2018.01)
*H04N 13/363* (2018.01)

(56) References Cited

U.S. PATENT DOCUMENTS

| | | |
|---|---|---|
| 2016/0031369 A1 | 2/2016 | Zietz |
| 2016/0033757 A1* | 2/2016 | Kurtz ................. G02B 26/0808 |
| | | 359/291 |
| 2017/0018214 A1 | 1/2017 | Black et al. |

OTHER PUBLICATIONS

International Search Report and Written Opinion for International Application No. PCT/US20/019251 dated May 7, 2020, 8 pages.

* cited by examiner

ANGULAR SPATIAL LIGHT MODULATOR MULTI-DISPLAY

CROSS-REFERENCE TO RELATED APPLICATION

This is a National Stage Application filed under 35 U.S.C. 371 based on International Patent Application No. PCT/US2020/019251, filed on Feb. 21, 2020, which claims the benefit of U.S. Provisional Application No. 62/808,960, filed Feb. 22, 2019 and entitled "ANGULAR SPATIAL LIGHT MODULATOR MULTI-DISPLAY," the entirety of each of which is incorporated herein by reference.

GOVERNMENT FUNDING

N/A

BACKGROUND OF THE INVENTION

1. Field of the Invention

The present disclosure is directed generally to Angular Spatial Light Modulator (ASLM) Multi-Displays, and more particularly, to a light projection system with a digital micro-mirror device (DMD) for projecting full-resolution, high quality images into different directions.

2. Description of Related Art

A Digital Micromirror Device (DMD) is an array of micromirror pixels which traditionally alternate between ON and OFF positions to direct light toward or away from a projection lens for arbitrary image projection. Currently, beam steering can be accomplished by illuminating the DMD with a short pulse of light during the transition of all the mirrors on the DMD, effectively 'freezing' the DMD at an arbitrary angle between the ON and OFF positions, programmable by nanosecond synchronization. DMDs have been used to harness the diffraction effects (e.g., CGHs) in applications such as in use with LIDAR systems. Currently, it is believed that the diffraction effects overpower the spatial modulation pattern in propagation such that a multi-display, high-quality, pixel-to-pixel mapping output by an angular-spatial light modulator (ASLM) is not feasible.

Therefore, there is a need for an ASLM technology applicable to high-quality display applications.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

BRIEF SUMMARY OF THE INVENTION

Embodiments of the present invention are directed to a light projection system for projecting full-resolution, high quality images into different directions. According to one aspect, the system includes a light source configured to provide a homogenous output beam of light and an illumination shaping optic elements configured with at least one of a predetermined cone angle, numerical aperture, and F-number. The system also includes a spatially-dependent, angular light modulator (ALM) with a plurality of pixels, each having an ON state, an OFF state, one input pupil, and N diffraction order pupils. The ALM is positioned such that the output beam is incident on the plurality of pixels. The at least one of the predetermined cone angle, numerical aperture, and F-number of the illumination shaping optic elements prevents contaminating light from entering an incorrect pupil. The system additionally includes a processor coupled to the ALM to provide discrete diffraction-based beam steering, whereby the ALM will project into one diffraction order at one time.

According to another aspect, the ALM will instead project into one or more diffraction orders at one time.

These and other aspects of the invention will be apparent from and elucidated with reference to the embodiment(s) described hereinafter.

BRIEF DESCRIPTION OF THE SEVERAL VIEWS OF THE DRAWING(S)

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments. Reference is now made briefly to the accompanying drawings, in which.

DETAILED DESCRIPTION OF THE INVENTION

Figure 1:
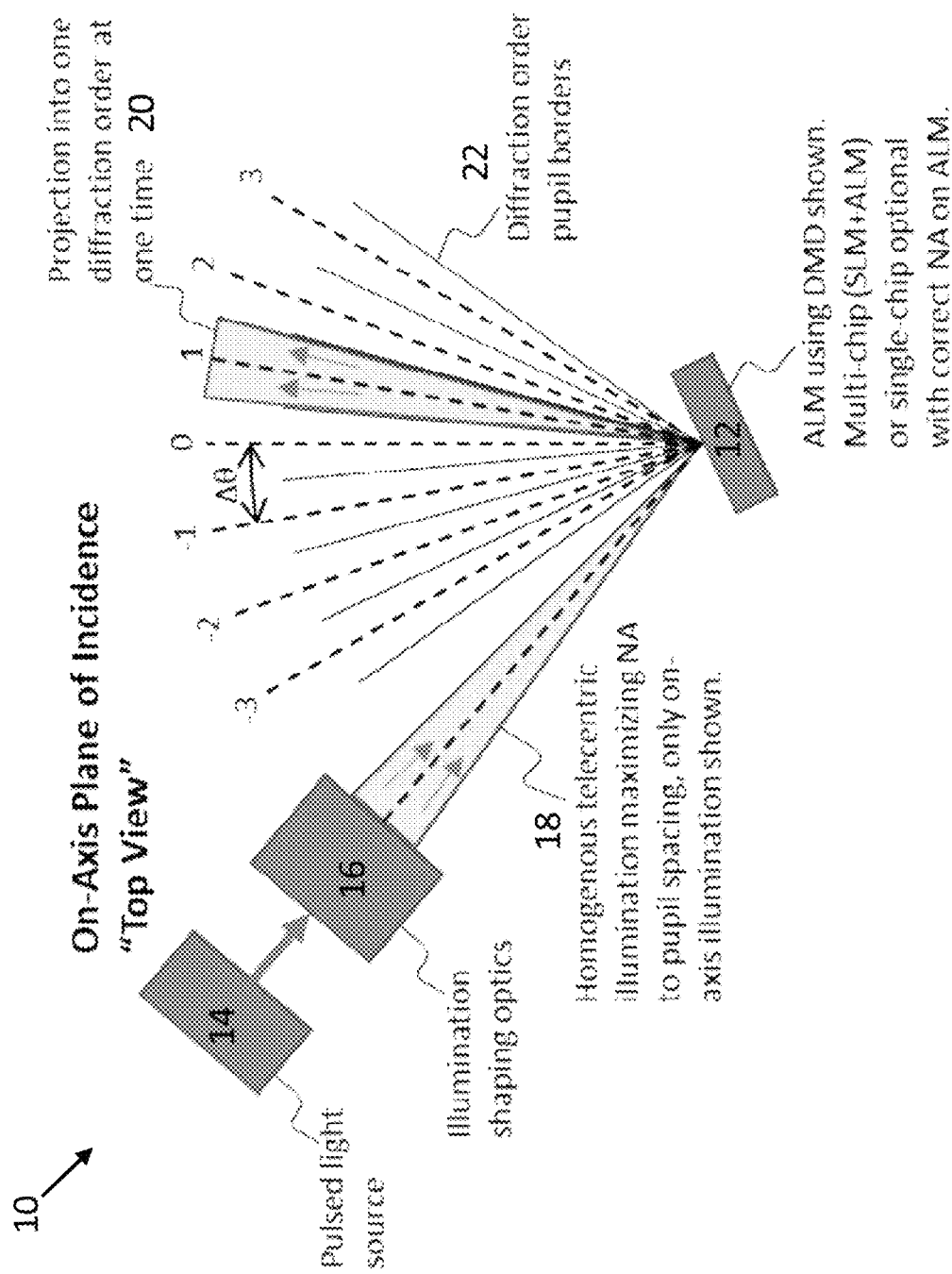
FIG. 1 is a top view schematic representation of a light projection system, according to an embodiment.

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

The present invention is a light projection system for multi-display ASLM illumination. The light projection system applies the selectable diffraction orders based on the following diffraction grating equation (1):

$$\rho \sin \theta_m = 2m\lambda \quad [\text{Eq. 1}]$$

where $\theta_m$ is the angle from the zeroth order to the mth order, $\rho$ is the mirror pitch (width), $\lambda$ is the wavelength of light in the beam, and the factor of 2 is due to the diamond micromirror orientation. Eq. 1 as set forth above is for instances where the angle of incidence of incoming light is normal to the mirror array surfaces. Mirror arrays according to aspects of the present invention may be operated with light projected at any angle with appropriate mathematical consideration.

In prior ASLM systems, the illumination was sometimes collimated, leading to significant diffraction ringing in propagation and preventing high-quality projection. Instead, similar to the traditional illumination design, the present light projection system illuminates the DMD with focusing, homogenous illumination with a cone angle/numerical aperture/F-number configured to prevent contaminating light entering incorrect pupils (as described in detail below). However, rather than just an ON and an OFF state (and a FLAT non-functional state), the ASLM configuration has one input pupil and N diffraction order pupils. Cover glass reflection is ignored, though it can be mitigated by anti-reflection coatings or by using an orthogonal wedge prism to re-direct the cover glass reflection away from the projection directions.

As known in the art, diffraction orders may not be exactly equally angularly spaced, though they are similarly spaced. In one example, a DLP3000 DMD is used and a 905 nm laser illuminates the DMD at a 30° angle of incidence, with diffraction order outputs with respect to the DMD normal at 20.5°, 11.0°, 0°, −11.5°, and −27.5°. These diffraction orders have an average spacing of 12°, with a min spacing of 9.5° and a max spacing of 16°. The outputs can be equalized using a telescope lens system, a lens array, a prism array, or other optics.

Preferably, the illumination half-angle cone is configured based on the minimum pupil spacing to reduce contamination, the maximum pupil spacing to avoid empty spaces in the eye-box and for better light efficiency, or the average spacing to balance the tradeoffs. In an example used herein throughout, the average angular spacing is used for a DLP3000 DMD with 7 diffraction orders at 532 nm. For illumination in air, the half-angle cone angle, $\alpha$, can be converted to numerical aperture, NA, by NA=sin $\alpha$.

Turning now to FIG. 1, there is shown a top view schematic representation of a light projection system 10, according to an embodiment. The light projection system 10 comprises an ALM 12 using a beam-steering DMD. The ALM 12 steers light into discrete diffraction orders (with no continuous steering of focused light). The ALM 12 can be a multi-chip such that a Spatial Light Modulator (SLM) is added into the illumination path before the DMD (the DMD acting as an Angular Light Modulator (ALM)) which enabled the simultaneous angular (diffraction order angular output selection) and spatial modulation (pattern control across a cross-section of the beam). The ALM 12 can also be a single chip (with correct NA on ALM). (Note: ALM 12 and DMD 12 are used in interchangeably hereafter).

The light projection system 10 includes a light (or illumination) source 14. The light source 14 emits pulsed light toward the DMD 12, as shown. An illumination shaping optic 16 is positioned between the light source 14 and the ALM 12. As described in detail herein, homogenous telecentric illumination 18 extends from the illumination shaping optics 16 to the ALM 12 (only on-axis illumination is shown). The homogenous telecentric illumination maximizes NA to pupil spacing. As shown in FIG. 1, the illumination is projected into one diffraction order 20 at a time (see pupil borders 22). Thus, FIG. 1 shows the illumination on a DMD with homogenous and telecentric illumination with a cone angle illumination designed to fit within the output pupil diffraction orders.

Figure 2:
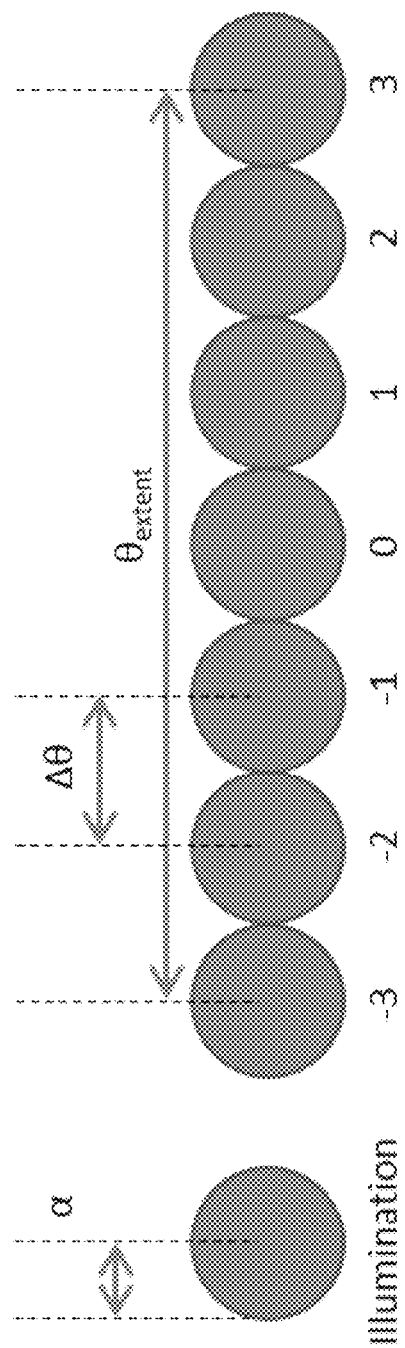
FIG. 2 is a schematic representation of illumination and output pupil diffraction orders, according to an embodiment.

The half-angle cone illumination $\alpha$ is limited in the dimension of steering (in the plane of incidence), as shown in FIG. 2. Since $\Delta\theta$ is typically not perfectly constant between all diffraction orders, the half-angle cone can be limited by the average:

$$\alpha \leq \frac{1}{2}\frac{\theta_{extent}}{N_{outputs}-1} \quad [\text{Eq. 2}]$$

If the diffraction orders are assumed to be equal, the half-angle cone is limited by:

$$\alpha \leq \frac{\Delta\theta}{2} \quad [\text{Eq. 3}]$$

The purpose of Eq. 2 and 3 is to prevent the output pupils from overlapping. The NA of the illumination is:

$$NA = \sin \alpha \quad [\text{Eq. 4}]$$

As stated above, the diffraction orders may not be equally spaced. However, all output pupils will be the same size at the input illumination pupil and centered on each diffraction order, as shown in FIG. 2. Other optics (e.g., prisms, mirrors, or lenses) can be used to make the output pupils equally spaced.

Figure 3:
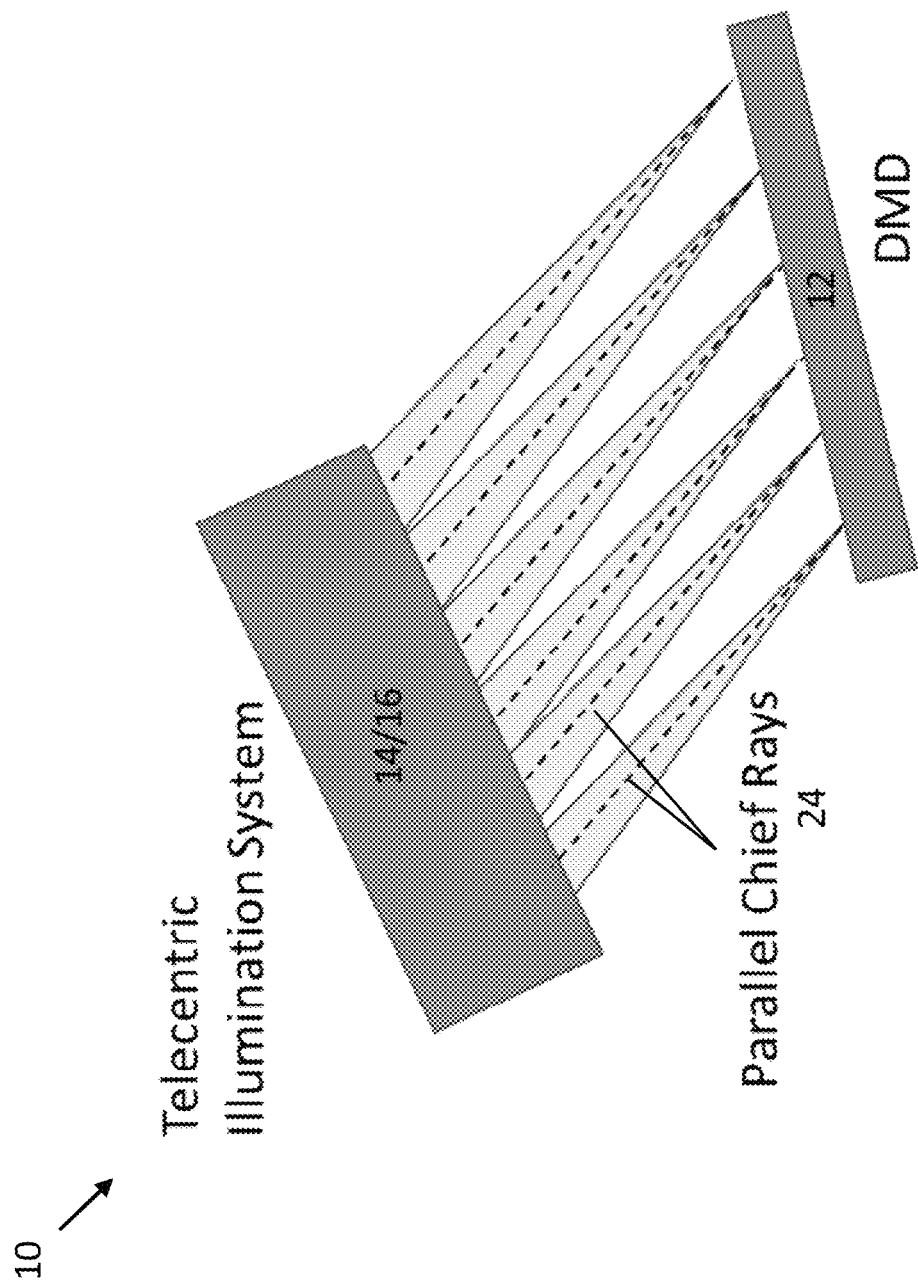
FIG. 3 is a top view schematic representation of a telecentric illumination system, according to an embodiment.

As described above, the ALM 12 is illuminated with homogenous telecentric illumination 18. The angles of the output diffraction orders are dependent on the angle of incidence of the illumination, meaning the illumination angles must be controlled across the area of the DMD 12. For fully-filled output pupils, the illumination must be telecentric: the chief rays across the entire DMD area must be parallel, approaching at the same angle of incidence, as shown in FIG. 3. Specifically, FIG. 3 shows that each point across the DMD 12 is illuminated with a bundle of rays. The chief ray 24 for each point along the DMD 12, commonly the central ray of each bundle, are all parallel.

Figure 4:
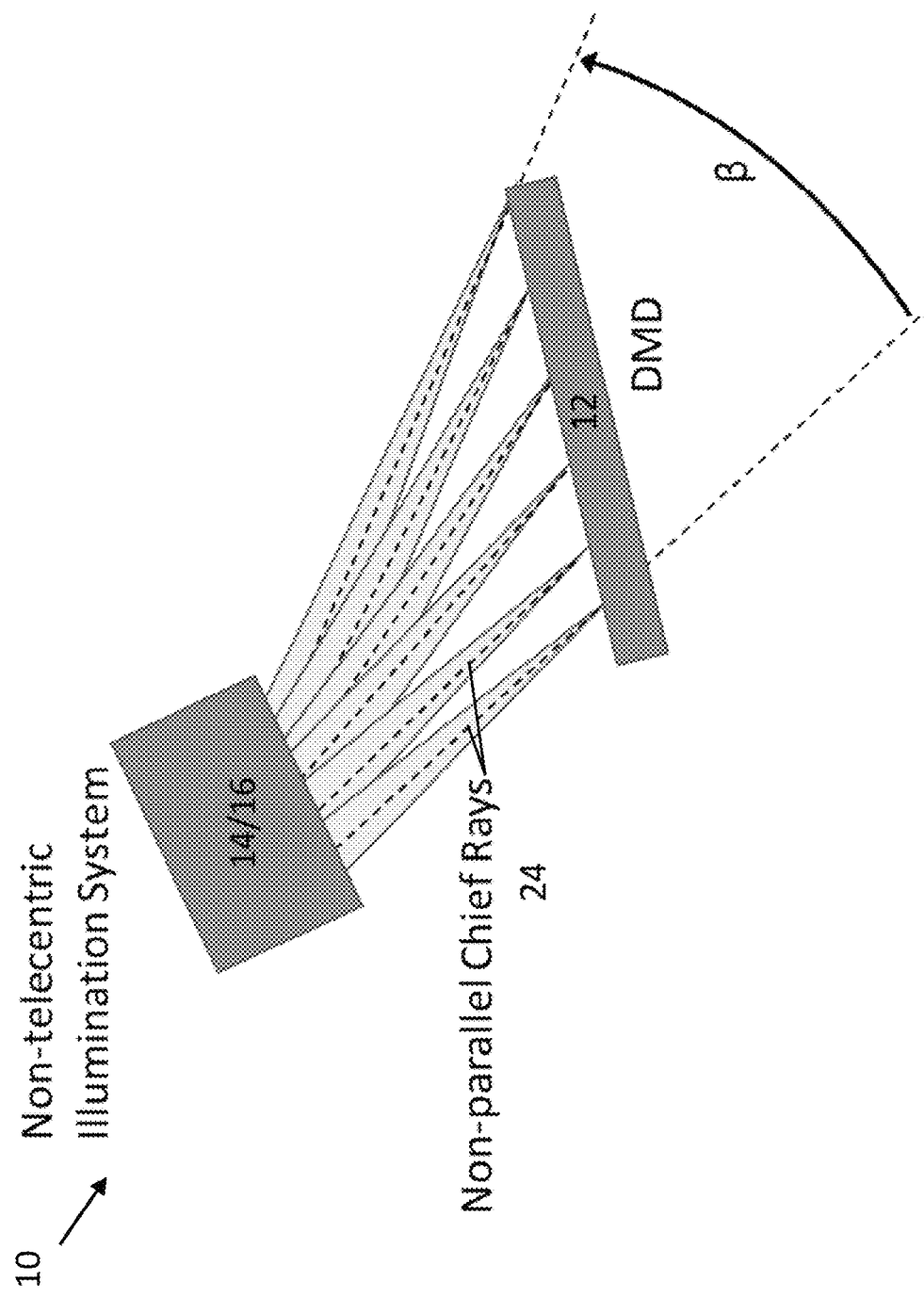
FIG. 4 is a top view schematic representation of a non-telecentric illumination system, according to an embodiment.

If the illumination is not parallel, the angles of the output diffraction orders will vary across the DMD, resulting in non-telecentric illumination as shown in FIG. 4. The chief rays 24 are not parallel across the DMD 12 and either diverge (FIG. 4) or converge. Non-telecentric illumination causes pupils to be pixel-specific, leading to vignetting or pupil contamination across the image. If the output does not require fully-filled output pupils (e.g., not used for 3D display but rather with a lens array for projection), there is a limit on the spread of the chief ray angles of incidence.

Figure 5:
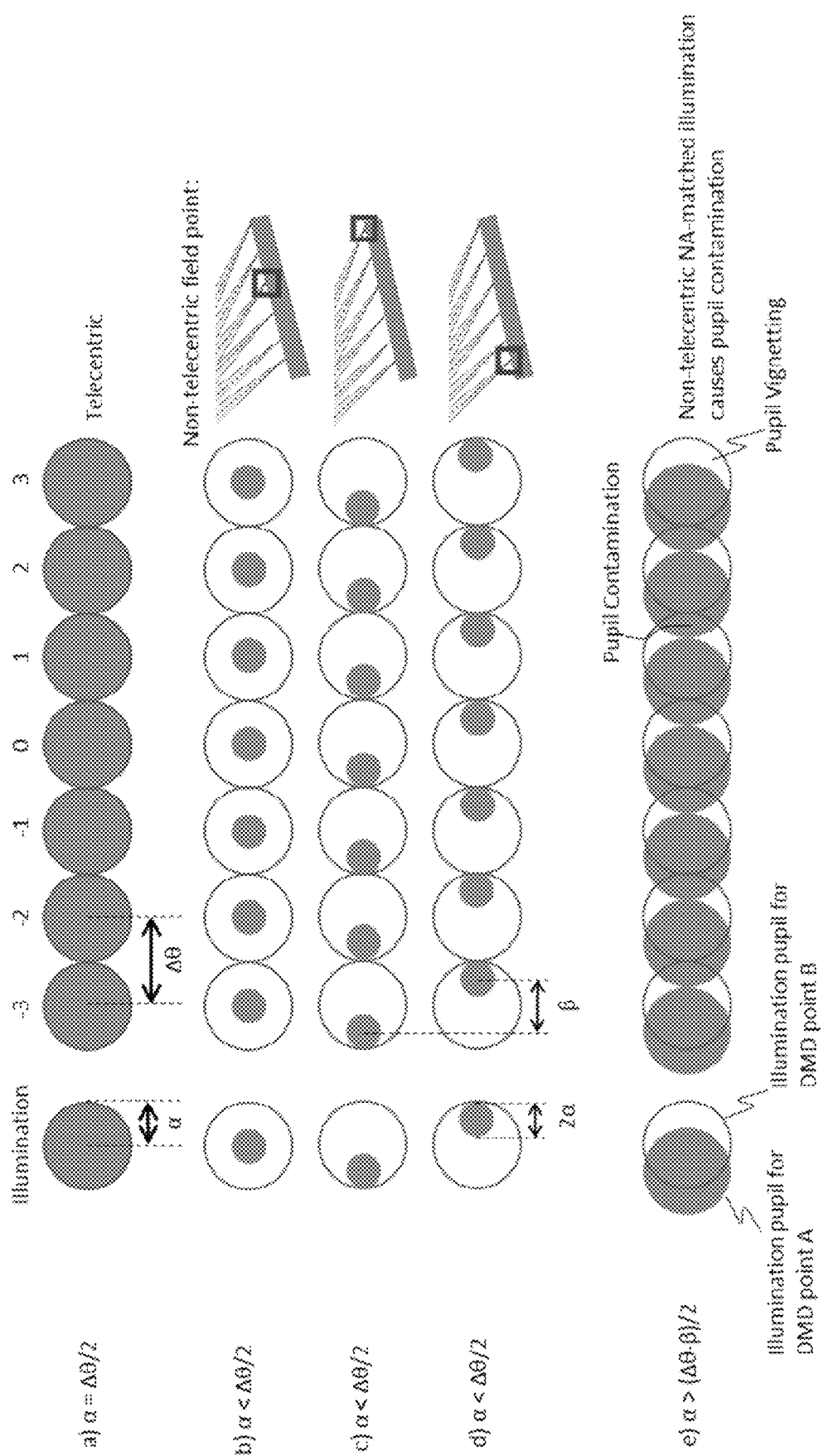
FIG. 5 is a schematic representation of illumination and output pupils of telecentric illumination systems and non-telecentric illumination systems.

Turning briefly to FIG. 5, there are shown input illumination pupils and output illumination pupils with varying illumination. In image (a) of FIG. 5, there is shown telecentric illumination as required by the fully filled output illumination pupils. In images (b)-(d) of FIG. 5, there is shown underfilled non-telecentric pupil illumination for a center point of the DMD (image (b)), a first side of the DMD (image (c)), and a second side of the DMD (image (d)). Image (d) of FIG. 5 shows total pupil shift, β, from image (c), but still within spacing of DMD output diffraction orders. In image (e), the input illumination cone angle $\alpha_{illumination}$ set to angle $\alpha_{max}$ and not reduced for non-telecentric illumination. The occurrence of pupil contamination and pupil vignetting is shown in image (e) of FIG. 5.

A small change in the input angle approximately equates to the same small change in the output diffraction order angle, but not exactly since the grating equation (Eq. 1) is not linear. For a non-telecentric system (FIG. 4) with a chief ray spread of β, the half-angle cone illumination α must be further reduced by β/2:

$$a \leq \frac{\Delta\theta - \beta}{2} \quad [\text{Eq. 5}]$$

Reducing the half-angle cone illumination in this way allows a tolerance for non-telecentric illumination. The purpose of Eq. 5, similar to Eq. 2 and 3, is to prevent the output pupils from overlapping, except Eq. 5 allows for non-telecentric conditions. Thus, the light projections system 10 can be a telecentric illumination system or a non-telecentric illumination system.

Figure 6:
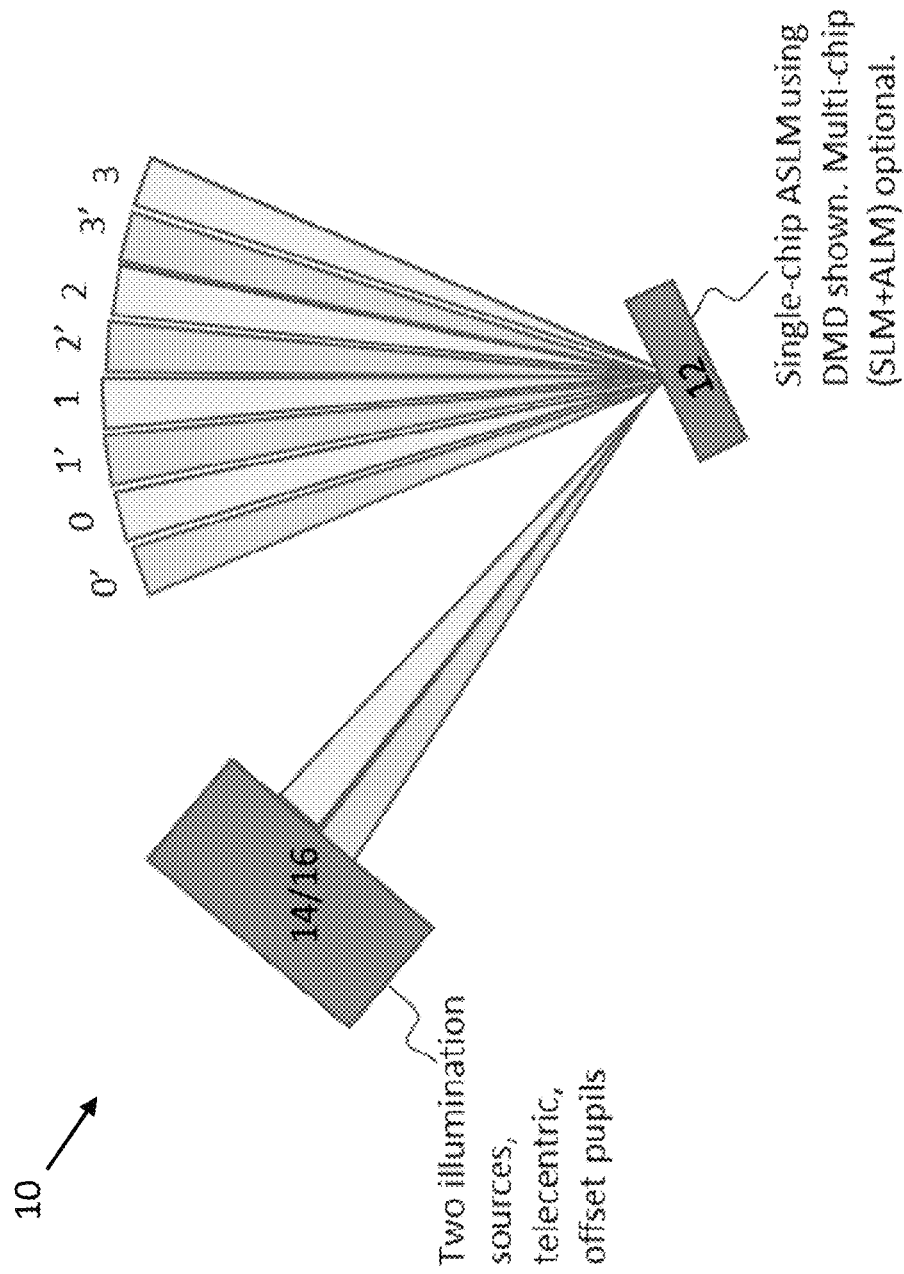
FIG. 6 is a top view schematic representation of a light projection system using two illumination sources to sequentially illuminate the ALM, according to an embodiment.
Figure 7:
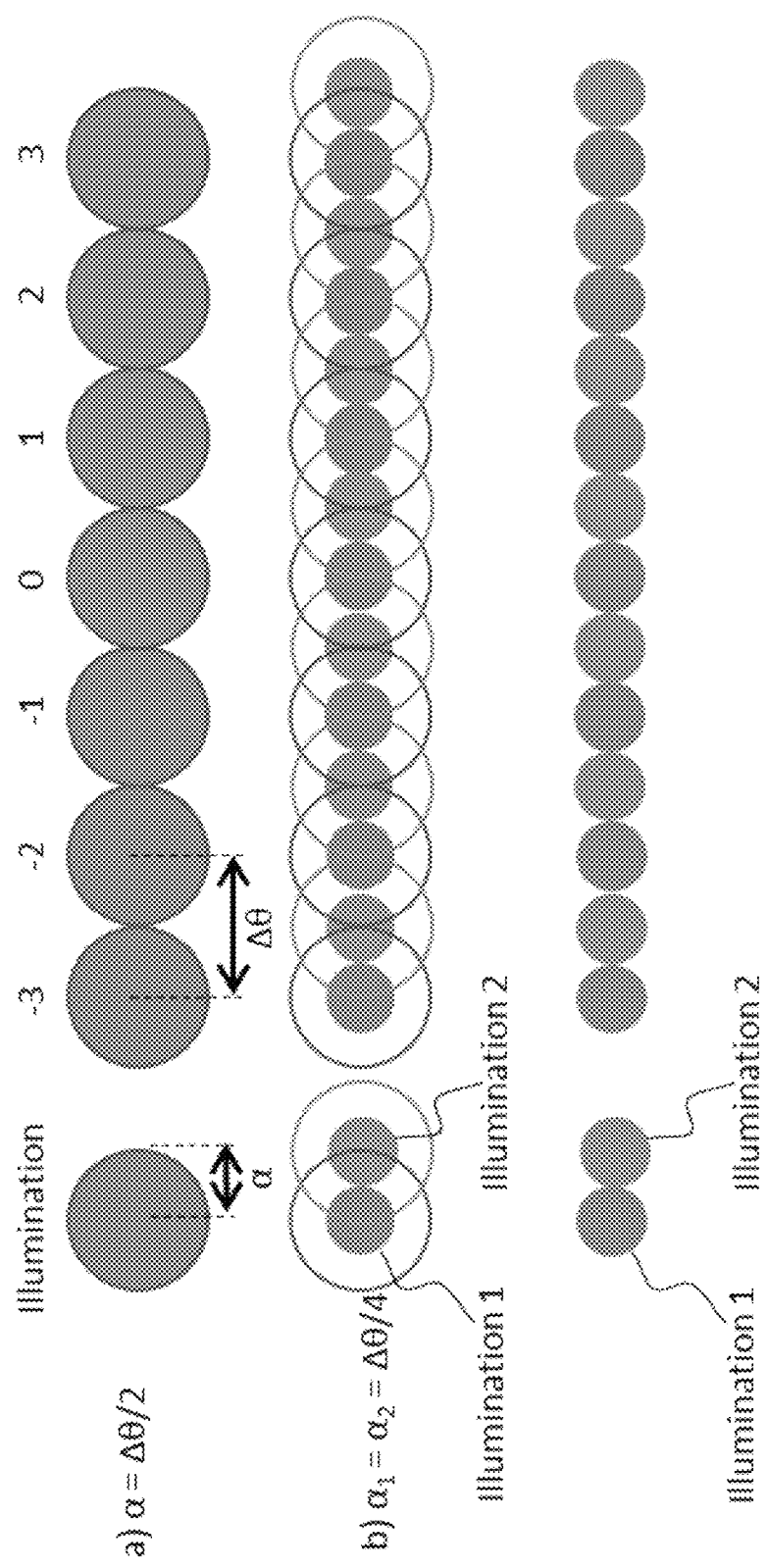
FIG. 7 is a schematic representation of a method for preventing overlap of different pupils.

Illumination angles can also be discretely controlled, maintaining telecentricity (or non-telecentricity within the tolerance listed above in Eq. 5) within each region of the DMD 12. This applies if the DMD 12 is segmented into different regions (e.g., each region has telecentric illumination, but at different angles of incidence to one another), or if the DMD 12 has multiple illumination sources (e.g., sequentially (in time) illuminating the DMD 12 from different angles with telecentric illumination). FIG. 6 shows an embodiment of the light projection system 10 wherein there are two illumination sources 14 sequentially illuminating the ALM 12. Each source 14 outputs into a different set of pupils. In other words, the DMD 12 creates a set of output pupil diffraction orders for each illumination angle of incidence. However, as shown in FIG. 7, the half-angle cone illumination α is still limited by the total number of output directions. Thus, a single source limits the half-angle cone a to $\Delta\theta/2$. But, with two source and interleaved output pupils, the half-angle cone angle must be further reduced to prevent overlap of different pupils.

As a reminder, Eq. 2 requires the number of outputs, $N_{outputs}$. This may be 7 for one source with 7 diffraction orders, or 14 for two sources each with 7 diffraction orders, etc. For instance, a DMD 12 can be telecentrically illuminated with a chief ray angle of incidence of 25° from a first illumination source, and telecentrically illuminated with a chief ray angle of incidence of 30° from a second illumination source. This would cause two sets of pupils (one per illumination source) to be output, offset by 5°.

Figure 8:
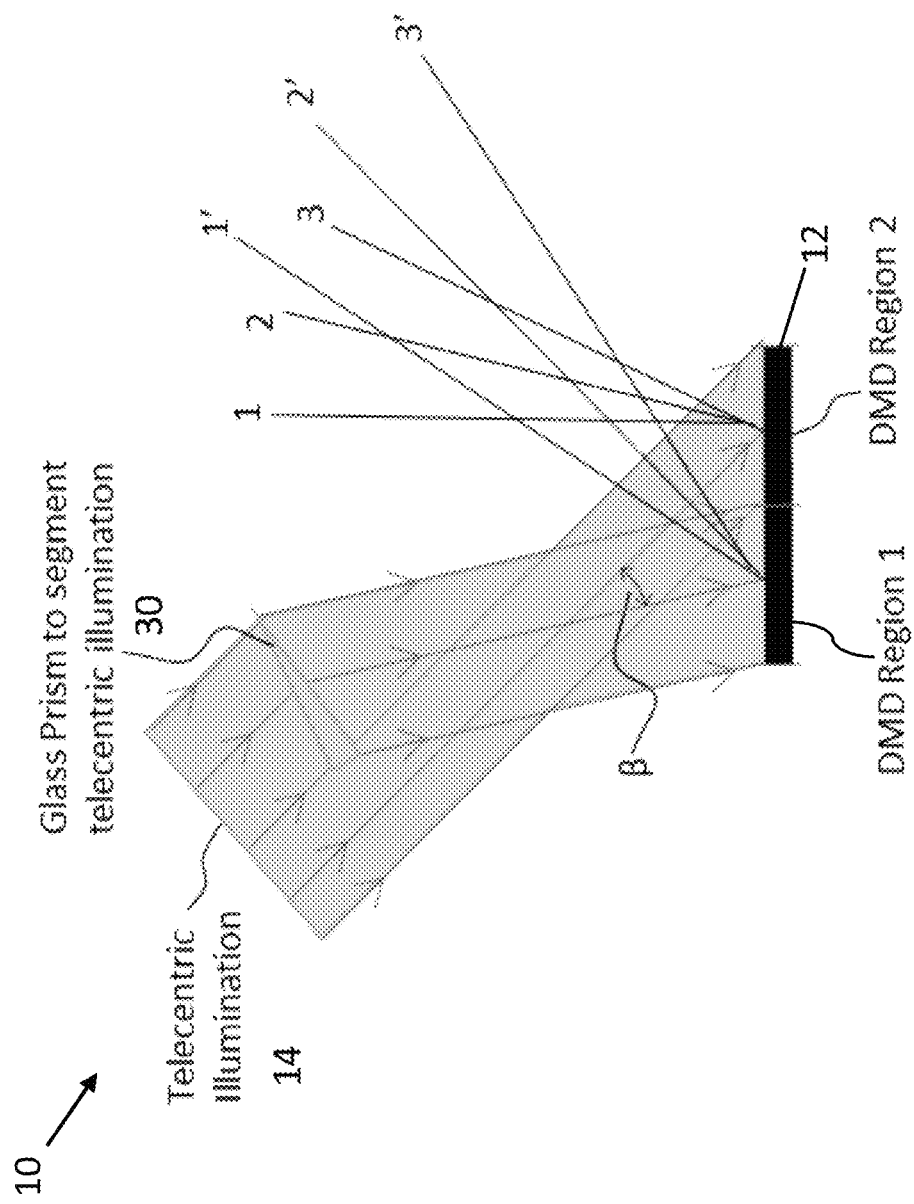
FIG. 8 is a top view schematic representation of a light projection system with segmented telecentric illumination, according to an embodiment.
Figure 9:
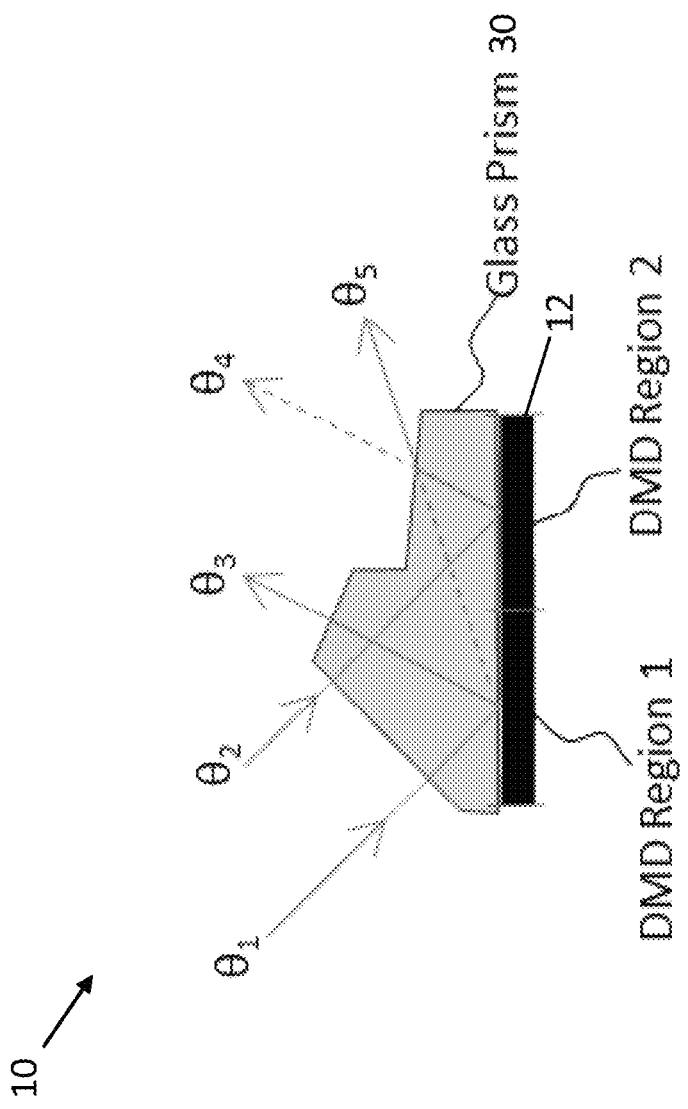
FIG. 9 is a top view schematic representation of a light projection system with a prism to create the appearance of DMD region overlap, according to an embodiment.

As another example, a DMD 12 may only have one illumination source, but the illumination is segmented into two regions such that each region is telecentrically illuminated at a different angle of incidence, as shown in FIG. 8. The segmented telecentric illumination can be created by combining a telecentric illumination system (FIG. 3) and a segmenting device 30, such as a prism or mirror system, to segment the illumination. In FIG. 8, a telecentric (i.e., parallel chief rays 24) illumination is split into two separately telecentric groups of rays, with angular offset β induced by the prism 30, illuminating two respective regions on the DMD 12. In the depicted embodiment, the prism 30 is a glass prism. Each illumination region on the DMD 12 has output diffraction orders in different output pupil directions respective to the illumination angle. It may be preferred that the different regions of the DMD 12 appear to overlap. This can also be achieved with prisms or mirrors 30 after the DMD 12, as shown in FIG. 9. In any of these examples, the output pupils must not overlap in order to avoid pupil contamination.

In an embodiment wherein the light projection system 10 is used for direct viewing 3D displays without glasses (i.e., projecting light directly into eyes), the region where an eye must be to capture light from an output pupil in known as the "eye box" 26. In image (a) of FIG. 10, the eye box 26 is shown comprising consecutive output pupils. The multiple output pupils can form different shapes (e.g., by configuring illumination optics before the DMD) to optimize the eye box 26 performance. This can include elongated pupils for an extended eye box or rectangular pupils to optimize the eye box fill factor. In image (a) of FIG. 10, the illumination and output pupils that circular.

Figure 10:
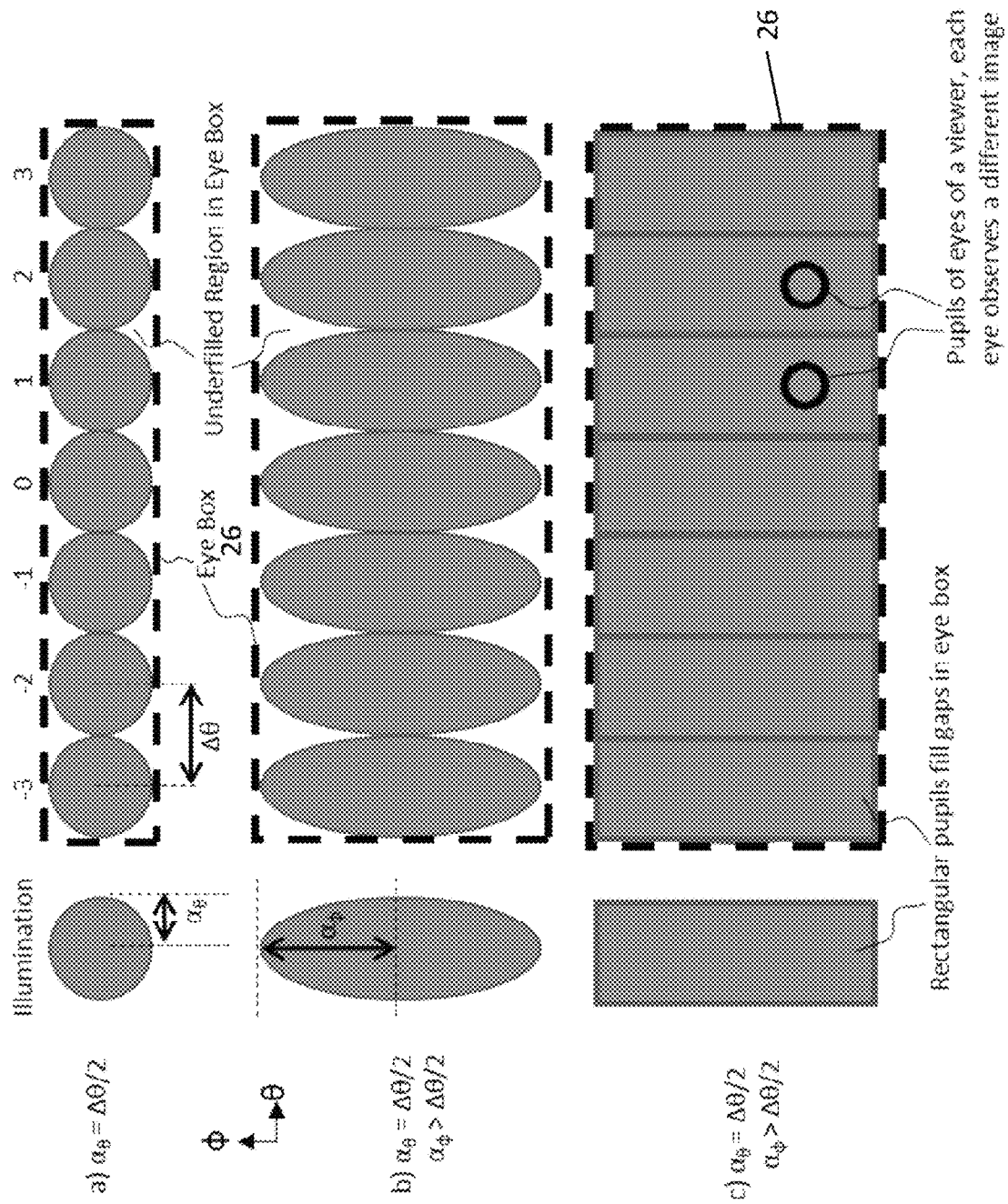
FIG. 10 is a schematic representation of non-circular output pupils.

However, in image (b) of FIG. 10, the illumination input pupil is elongated, which elongates the output pupils and changes the shape of the eye box 26 without increasing the number of output diffraction orders. While the illumination cone half-angle in the axis of the DMD beam steering, $\alpha_\theta$ (in θ-axis), is limited by the output diffraction order spacing, Δθ (as shown in Eq. 3), the illumination cone half-angle in the axis orthogonal to the axis of DMD beam steering, $\alpha_\varphi$ (in φ-axis), is not limited by Δθ. In image (c) of FIG. 10, the illumination input pupil is rectangular, which causes the output pupils to fill the entire eye box 26 without overlapping pupils. With both the elongated illumination input pupils and rectangular illumination input pupils, light is captured from different output diffraction orders to observe to images (e.g., for 3D display).

Figure 11:
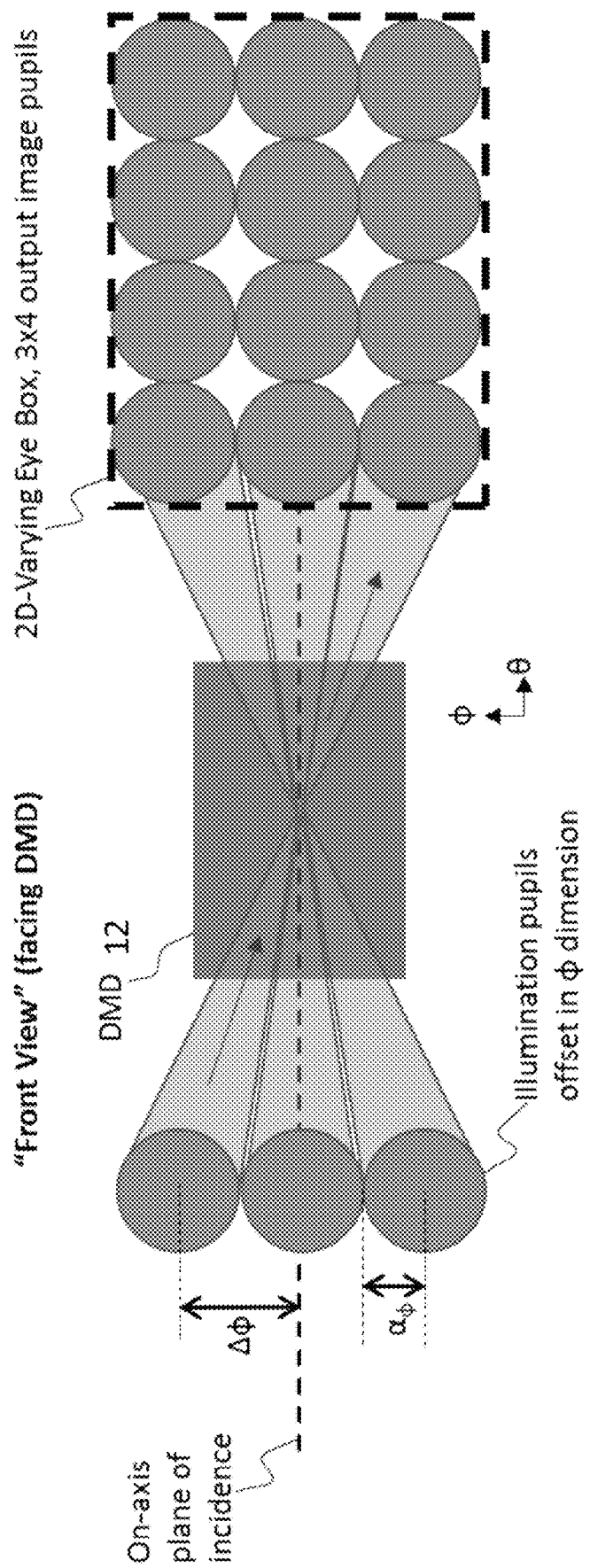
FIG. 11 is a front view schematic representation of a DMD illuminated by three input sources.

More output diffraction pupils with different projected image patterns can be created by illuminating the DMD 12 sequentially (in time) from angles off-axis from the DMD mirror rotation. This can be achieved by multiple illumination sources at different angles (FIG. 11) or by changing the illumination angle of a single source. In an example, FIG. 11 shows a front view of the DMD 12 illuminated by three input sources. Each source illuminates the DMD 12 from different angles, separated by $\Delta\phi$, in the axis orthogonal to the axis of the DMD beam steering ($\phi$-axis). The illumination half-angle cone in the axis orthogonal to the DMD beam steering is $\alpha_\phi$. The illumination cone half-angle in the axis orthogonal to the axis of DMD beam steering ($\varphi$-axis) is limited by the angular spacing of the different illumination sources, Asp, by Eq. 6 (similar to Eq. 3):

$$a_\phi \leq \frac{\Delta\phi}{2} \qquad [\text{Eq. 6}]$$

$\Delta\varphi$ is independent from the diffraction effects of the DMD 12 and purely dependent on the design of the illumination system prior to the DMD 12.

Figure 12:
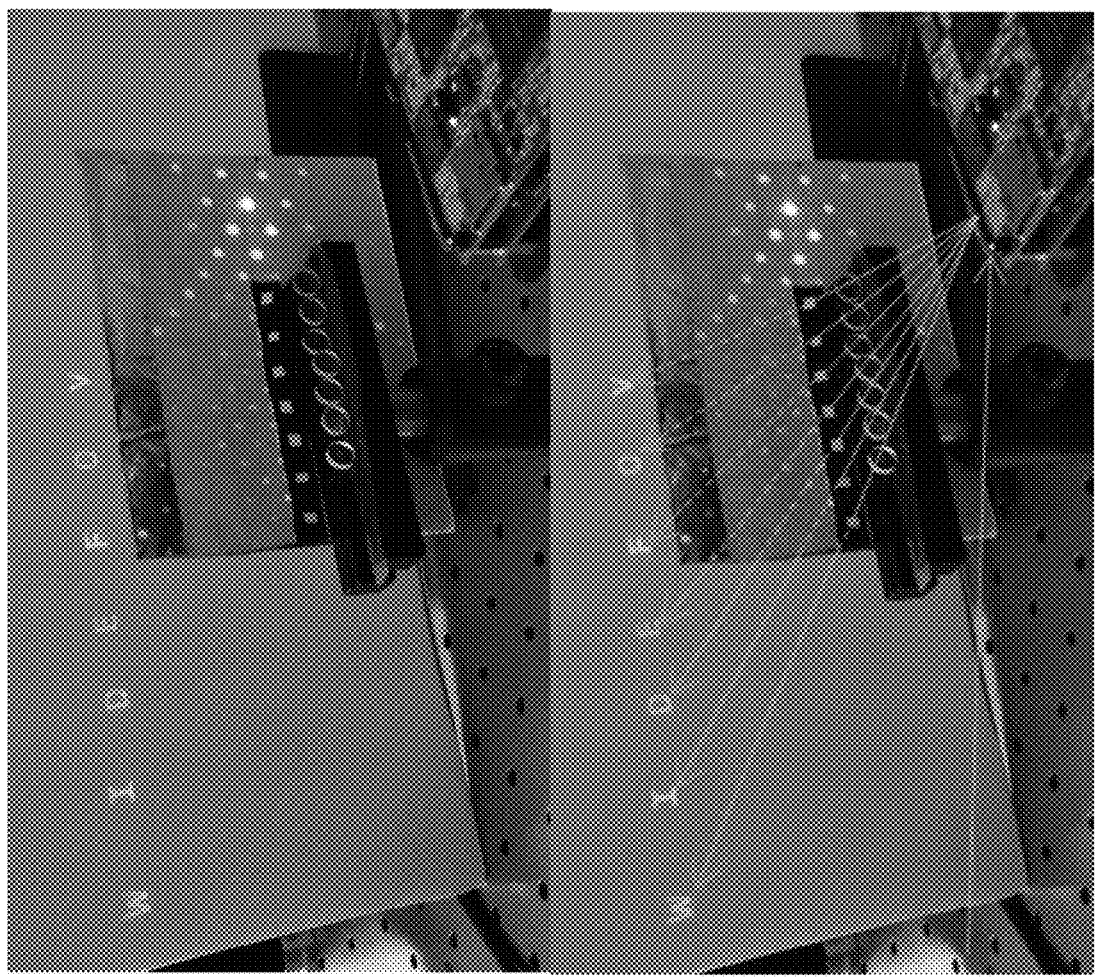
FIG. 12 shows images of ~0.01 NA illumination onto a DMD sequentially projecting 7 different patterns in 7 different directions at about 1 kHz frequency.
Figure 13:
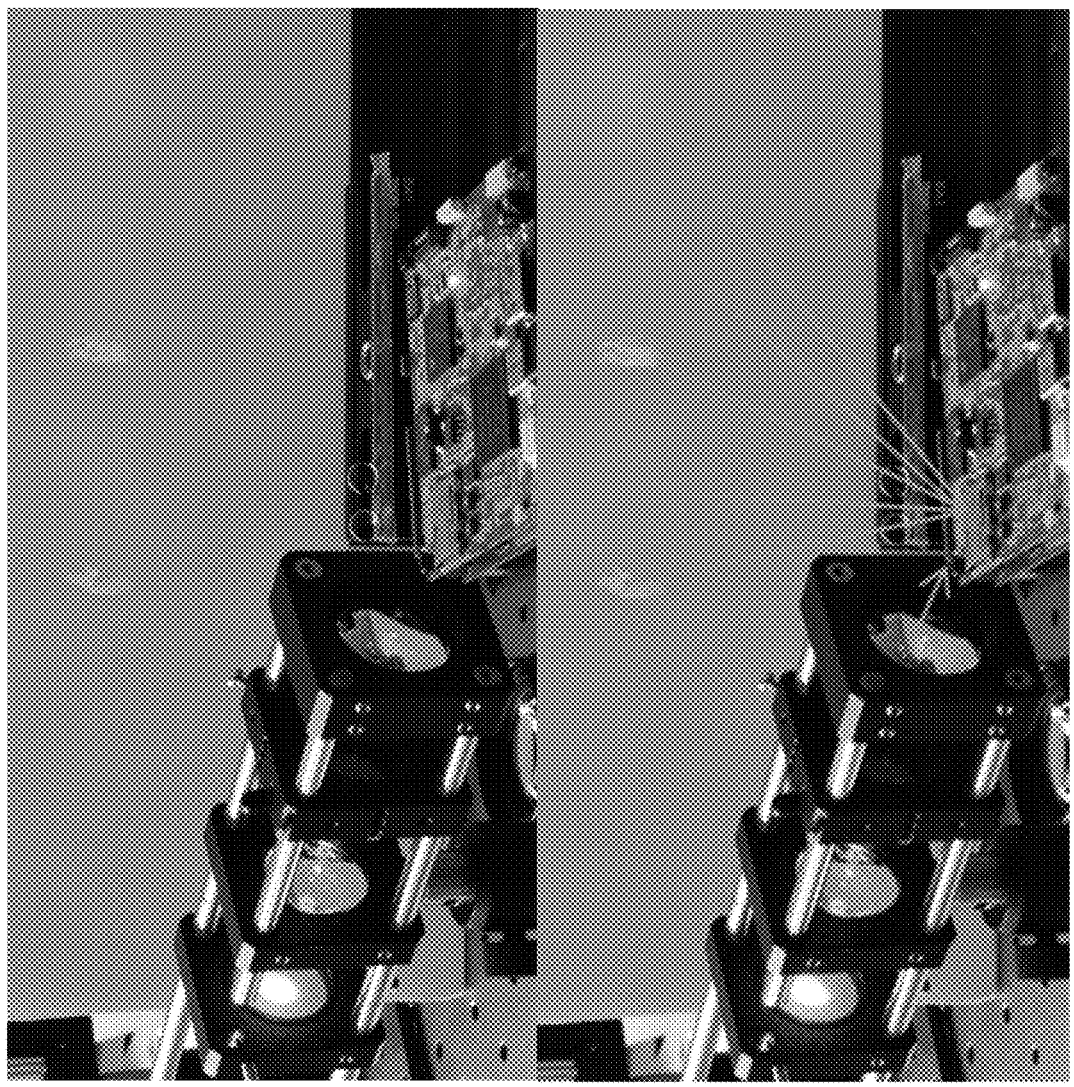
FIG. 13 shows images of homogenous, telecentric, ~0.1 NA illumination projecting 5 pupils, two of which are captured by lenses to project different images of Princess Leia.
Figure 14:
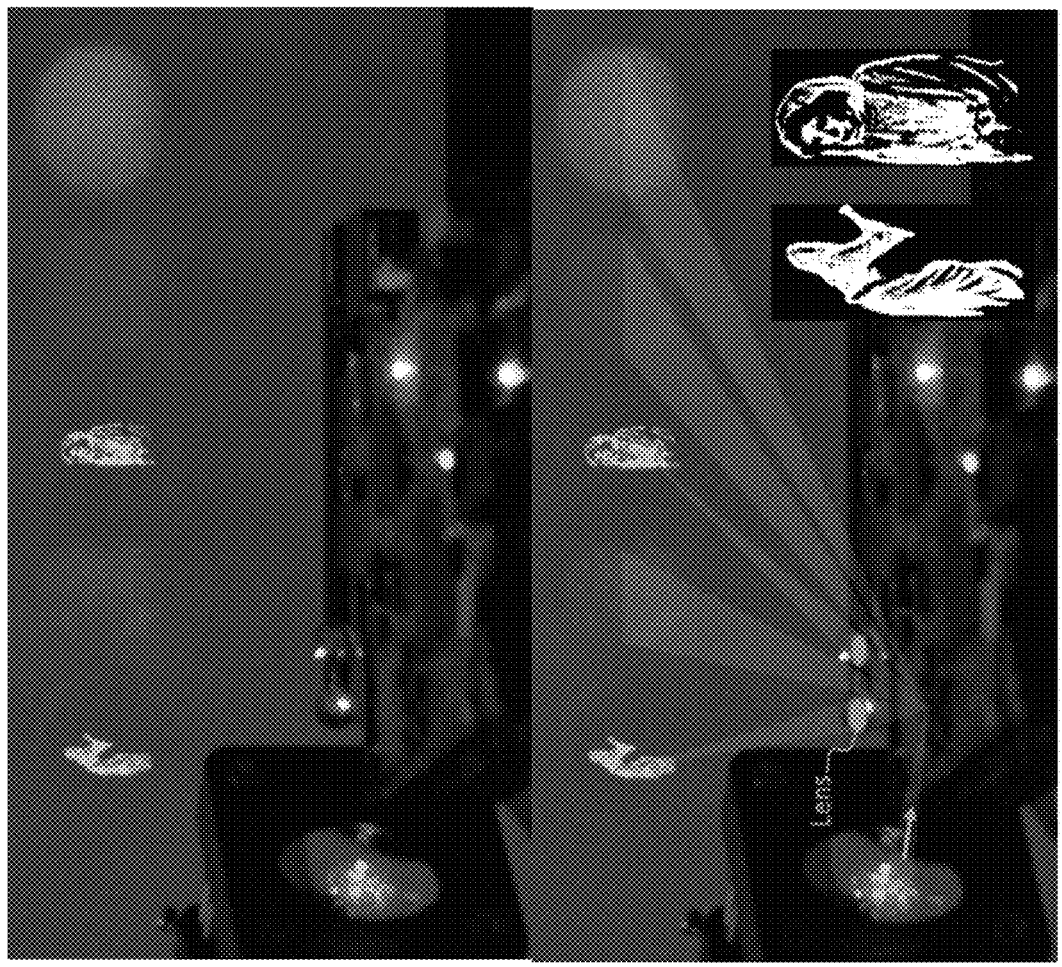
FIG. 14 shows images of homogenous, telecentric, ~0.1 NA illumination projecting 5 pupils, two of which are captured by lenses to project different images of Princess Leia and the respective binary patterns.

Referring now to FIGS. 12-18, there are shown a variety of projection optics. Turning FIGS. 12-14, a lens is be placed in each pupil to project its respective pattern. The lens can either project a real image (e.g., on a projection screen) or a virtual image (e.g., infinite conjugate for projection directly into an eye). FIG. 12 shows an example with ~0.01 NA illumination onto a DMD sequentially projecting 7 different patterns in 7 different directions at about 1 kHz frequency. Each lens in the array captures light from only one pupil, projecting the respective pattern onto the screen. A filter plane prevents higher diffraction orders from propagating to the projection screen. In FIG. 13, homogenous, telecentric, ~0.1 NA illumination projecting 5 pupils, two of which are captured by lenses to project different images of Princess Leia. FIG. 14 shows homogenous, telecentric, ~0.1 NA illumination projecting 5 pupils, two of which are captured by lenses to project different images of Princess Leia. The pupils are underfilling the spacing between diffraction order outputs. The angular extent of each pupil is equivalent. The respective binary patterns are additionally shown in FIG. 14.

Figure 15:
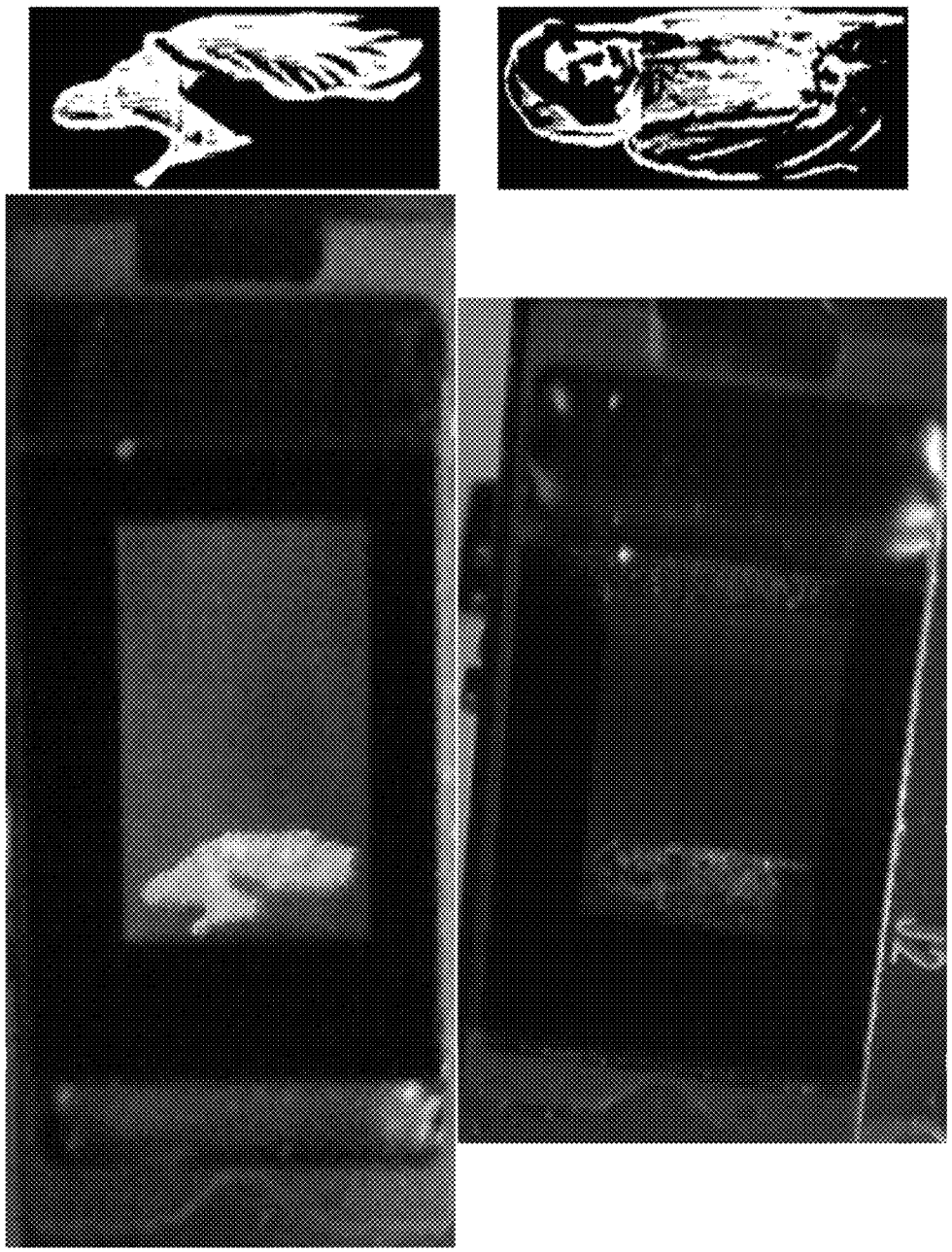
FIG. 15 shows images of direct observation by a camera of the DMD at two different angles, and their respective binary patterns.

Turning now to FIG. 15, a direct display is shown, incorporating no optics between the DMD 12 and the observing camera. Since the DMD 12 is outputting multiple non-overlapping pupils, the DMD 12 can be viewed directly to observe the different patterns from different observation angles. The images in FIG. 15 were captured of the DMD 12 with a camera, where the camera is observing the same patterns that an eye would observe. This example demonstrates a light field, with spatial and angular modulation, generated at a single-plane. FIG. 15 shows direct observation of the DMD at two different angles and their respective binary patterns.

Figure 16:
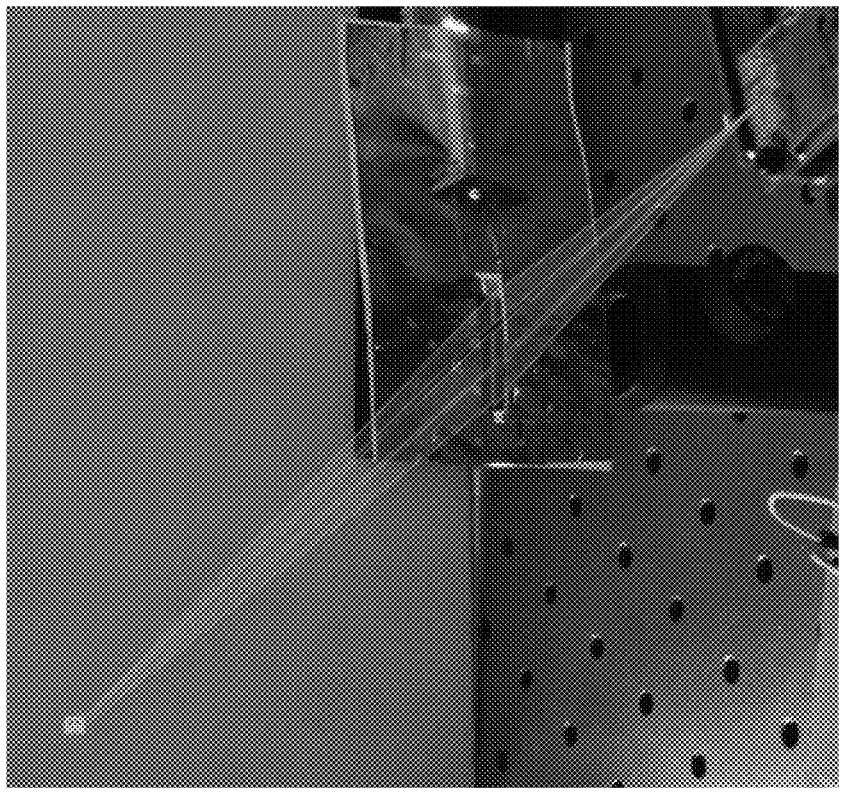
FIG. 16 shows images from three output pupils captured and imaged by a single lens to form overlapping images on a projection screen.
Figure 16:
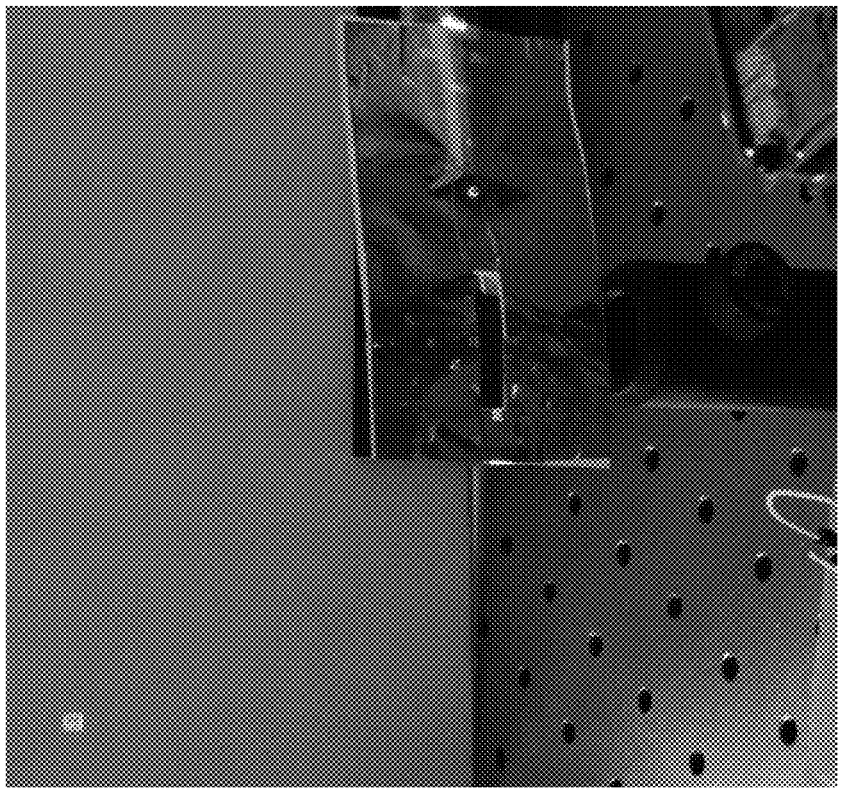

Turning to FIG. 16, a single lens is used. Instead of multiple lenses each capturing a different pupil, a single lens can capture and project multiple pupils simultaneously to reconstruct the original light-field plane generated by the DMD 12, including the different angle-dependent patterns. This allows the light-field plane to be projected to a real image plane (e.g., for angularly-multiplexed hologram writing) or to a virtual (e.g., infinite conjugate) image plane for 3D display. FIG. 16 shows three output pupils captured and imaged by a lens to form overlapping images on a projection screen.

Figure 17:
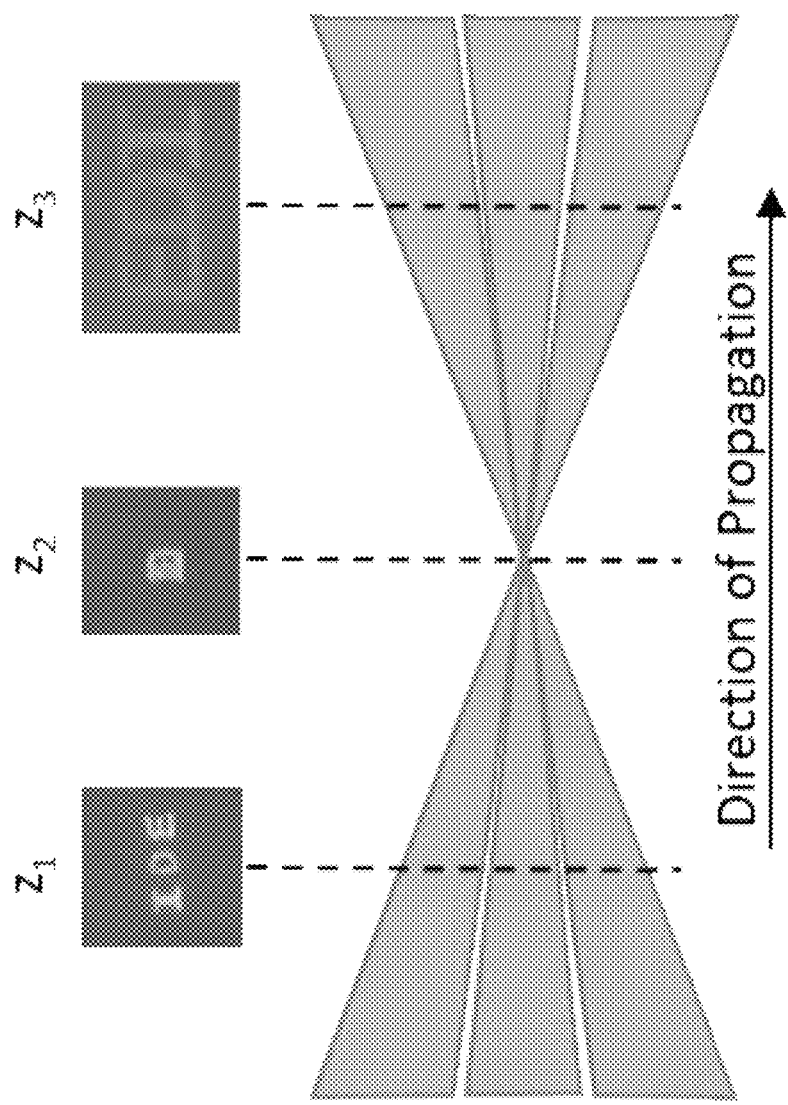
FIG. 17 is a schematic representation of low NA (~0.01) illumination used to create a very long depth of focus.

In FIG. 17, low NA (~0.01) illumination was used to create a very long depth of focus. This allows us to visually identify which pupil corresponds to each pupil. At projection screen distance $z_1$, three spatially-separate pupils can be seen (they appear to form images due to the low NA, but they are actually out-of-focus). The three patterns are in focus and overlapping at the light-field plane, a projection screen distance of $z_2$. After the light-field plane, the "E" and "I" pupils have swapped sides, showing how the center rays of each of the outer pupils are converging to the light-field plane and diverging from the light-field plane. This verifies the light-field plane can be imaged because the multiple images in-focus at the light-field plane are angle-dependent.

Figure 18:
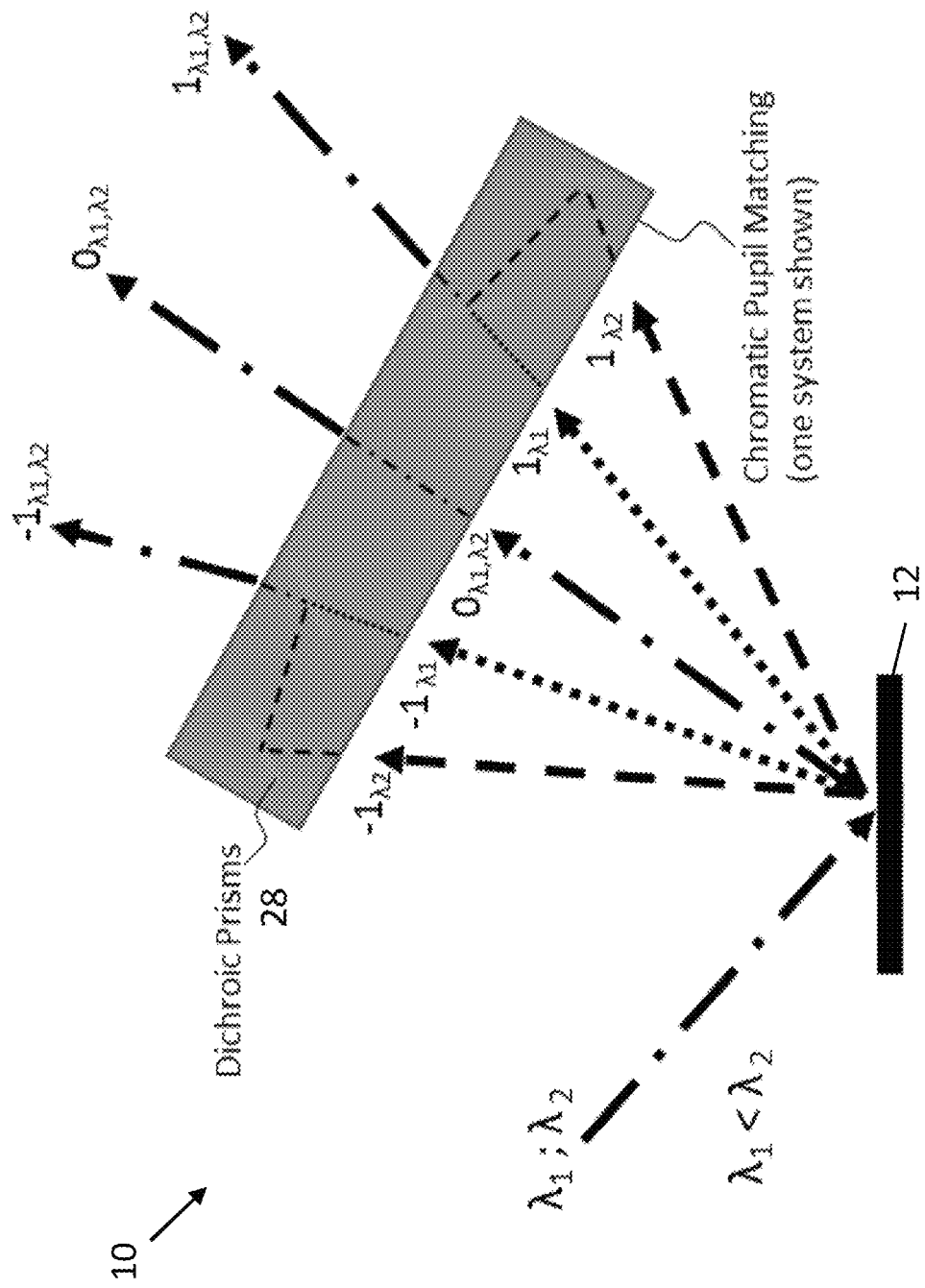
FIG. 18 is a schematic representation of a light projection system with two-wavelength illumination of a DMD, according to an embodiment.

Similar to traditional DMD projection, full-color projection can be created by illuminating the DMD 12 with sequential pulses of light of different wavelengths. This can be accomplished with a single DMD 12 or with multiple DMDs (2 or 3) 12, where each DMD 12 is illuminated with a different wavelength(s) and are made to optically overlap (e.g., by dichroic mirrors or prisms). However, the system 10 herein has diffraction-based, wavelength-dependent pupil output directions. Aside from the images needing to overlap, the pupil outputs need to angularly and spatially overlap. An exemplary embodiment of the system 10 is shown in FIG. 18 with two-wavelength illumination of the DMD 12. This can be achieved using prisms, prism arrays, dichroic mirrors, telescopes and/or other optics 28. For example, dichroic prisms 28 are used in the system 10 in FIG. 18.

In an embodiment, the system 10 in FIG. 1 can use a single-chip ASLM. The multi-display ASLM output can be achieved either by modulating the spatial amplitude before the DMD 12 or by modulating the spatial amplitude on the DMD 12 (i.e., by selecting which pixels switch). In either case, the ALM 12 must have the controlled illumination NA and telecentricity.

In an embodiment, multi-bit-depth projection is achieved by time integration of sequential binary patterns projected into each output pupil. For instance, 7 binary frames with constant-level (i.e., brightness) illumination from light source 14 can be projected into a single output pupil in quick succession for time-integrated 3-bit (0-7) grayscale projection. Alternatively, multi-level illumination can be used to enable higher bit depths in fewer binary frames. For instance, 3 sequentially-projected binary frames, with respective normalized multi-level illumination of 1, ½, and ¼ from light source 14, can be projected into a single output pupil in quick succession for time-integrated 3-bit (0-7) grayscale projection.

In the case of constant-level illumination, there is the issue of integrating the correct frames. For instance, if a single output pupil is captured by a video camera with a finite frame rate, the correct grayscale level can only captured by the camera (assuming sufficient spatial resolution) if the correct binary frames are projected within the integration time of the camera's frame. It is therefore beneficial to distribute bits evenly across the integration period rather than successively in time. For instance, populating a level of 4 in a 3-bit sequential projection as 1010101 is more likely to be captured as mid-level than 1111000 which may greatly sway previous or successive captured frames unsynchronized to ALM 12. The following lines of Matlab code can distribute bits evenly across an integration period for a given power level and bit depth:

```
bit_depth = 3;
power_val = 4; % on scale from 0 to (2^bit_depth-1)
order = zeros(1,2^bit_depth-1);
for m = 1:2^bit_depth-1
    order(m) = bin2dec(fliplr(dec2bin(m-1,bit_depth)))+1;
end
order<=power_val
```

In an embodiment, multiple pulses can illuminate the DMD 12 during a single transition to project patterns into multiple directions. However, the spatial patterns of each output will be the same unless other modulation is configured, possibly between pulses.

In an embodiment, each input illumination angle outputs a set of diffraction orders, so multiple illumination sources can illuminate the ALM 12 from different directions to achieve more outputs. Similarly, the illumination angle can be scanned by beam steering device such as a fast steering or MEMS mirror to achieve different angles of incidence. In either event, the output pupils for each image region need to not overlap in order to prevent-pattern contamination.

As stated previously, the angles of the output diffraction orders are dependent on wavelength and angle of incidence. In an embodiment, a full-color implementation can be achieved by overlapping different output diffraction orders of different wavelengths. Additionally, multiple sources of different wavelengths and/or angles of incidence may be used. By example, output diffraction order +3 from a first source of a first wavelength with a first angle of incidence may overlap output diffraction order +2 from a second source of a second wavelength with a second angle of incidence. In this manner, a full color implementation may be achieved by placement of light sources 14 rather than optics after ALM 12.

In an embodiment, each light source 14 may be encoded by optical multiplexing parameters, such as wavelength and polarization, and the output pupils of each of these multiplexed light sources may initially overlap before demultiplexing for their intended use. For a single multiplexed source, the output pupils must not overlap to maintain independent angular channels.

In an embodiment, light source 14 comprises an array of light sources, each light source within the array of extended area and tangent to one another. The light source array 14 may illuminate ALM 12 in a Koehler illumination scheme: the light source array 14 illuminates ALM 12 through a lens, and the focal length of the lens is about the distance between the light source array 14 and the lens and the distance between the lens and ALM 12. The spatial extent of the light source array 14 is therefore mapped to the input pupil of ALM 12. The spatial extent of the light source array 14 is limited to the angular extent between output diffraction orders of ALM 12. In this manner, each source within the source array 14 creates a set of output diffraction order pupils which do not overlap with the output diffraction order pupils from any other source of the array 14. In a different embodiment, a similar array of output pupils can be created using a single extended illumination source and a beam steering mirror as a light source 14 instead of the array of light sources, though the illumination optics would need to be adapted.

The article "Angular and spatial light modulation by single digital micromirror device for multi-image output and nearly-doubled etendue" by inventors Brandon Hellman and Yuzuru Takashima, published on Jul. 16, 2019 in Optics Express, volume 25, issue 15, pages 21477-21496, is incorporated herein by reference.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A light projection system, comprising:
    a light source configured to provide a homogenous output beam of light;
    illumination shaping optic elements configured with at least one of a predetermined cone angle, numerical aperture, and F-number;
    a spatially-dependent, angular light modulator (ALM) having a plurality of pixels, each of the plurality of pixels having one input pupil and N diffraction order pupils, the ALM positioned such that the output beam is incident on the plurality of pixels;
    wherein the at least one of the predetermined cone angle, numerical aperture, and F-number of the illumination shaping optic elements prevents contaminating light from entering an incorrect pupil;
    a processor coupled to the ALM to provide discrete diffraction-based beam steering, whereby the ALM projects into one or more diffraction orders at one time; and
    a segmenting device positioned between the light source and the ALM.

2. The system of claim 1, wherein the light source is a pulsed light source.

3. The system of claim 1, wherein the ALM is segmented in two or more regions.

4. The system of claim 1, wherein the segmenting device is a prism.

5. The system of claim 1, wherein each of the plurality of pixels further comprises an ON state and an OFF state.

6. The system of claim 5, wherein the ALM is a digital mirror device (DMD).

7. The system of claim 1, wherein the homogenous output beam of light is telecentric.

8. The system of claim 1, wherein the light source emits pulses of light with two or more wavelengths.

9. The system of claim 8, further comprising an optic placed within the projection of the ALM.

10. The system of claim 9, wherein the optic is a prism.

11. The system of claim 8, wherein the N diffraction order pupils are wavelength dependent, and one or more N diffraction order pupils of a first wavelength overlap with one or N diffraction order pupils of a second wavelength.

12. A light projection system, comprising:
a light source comprising two or more light sources configured to provide a homogenous output beam of light;
illumination shaping optic elements configured with at least one of a predetermined cone angle, numerical aperture, and F-number;
a spatially-dependent, angular light modulator (ALM) having a plurality of pixels, each of the plurality of pixels having one input pupil and N diffraction order pupils, the ALM positioned such that the output beam is incident on the plurality of pixels;
wherein the at least one of the predetermined cone angle, numerical aperture, and F-number of the illumination shaping optic elements prevents contaminating light from entering an incorrect pupil; and
a processor coupled to the ALM to provide discrete diffraction-based beam steering, whereby the ALM projects into one or more diffraction orders at one time.

13. The system of claim 12, wherein the two or more light sources provide multiple homogenous output beams of light, and each of the multiple homogenous output beams of light is incident on the plurality of pixels at a different angle of incidence.

14. A light projection system, comprising:
a light source configured to provide a homogenous output beam of light;
illumination shaping optic elements configured with at least one of a predetermined cone angle, numerical aperture, and F-number;
a spatially-dependent, angular light modulator (ALM) having a plurality of pixels, each of the plurality of pixels having one input pupil and N diffraction order pupils, the ALM positioned such that the output beam is incident on the plurality of pixels;
wherein the at least one of the predetermined cone angle, numerical aperture, and F-number of the illumination shaping optic elements prevents contaminating light from entering an incorrect pupil;
a processor coupled to the ALM to provide discrete diffraction-based beam steering, whereby the ALM projects into one or more diffraction orders at one time; and
wherein a beam steering device positioned between the light source and the ALM directs the output beam of light to be incident on the plurality of pixels at a selectable angle of incidence.

15. A light projection system, comprising:
a light source configured to provide a homogenous output beam of light, wherein the light source emits pulses of light with two or more polarizations;
illumination shaping optic elements configured with at least one of a predetermined cone angle, numerical aperture, and F-number;
a spatially-dependent, angular light modulator (ALM) having a plurality of pixels, each of the plurality of pixels having one input pupil and N diffraction order pupils, the ALM positioned such that the output beam is incident on the plurality of pixels;
wherein the at least one of the predetermined cone angle, numerical aperture, and F-number of the illumination shaping optic elements prevents contaminating light from entering an incorrect pupil;
a processor coupled to the ALM to provide discrete diffraction-based beam steering, whereby the ALM projects into one or more diffraction orders at one time.

16. The system of claim 15, wherein one or more N diffraction order pupils of a first polarization overlap with one or N diffraction order pupils of a second polarization.

17. A light projection system, comprising:
a light source configured to provide a homogenous output beam of light;
illumination shaping optic elements configured with at least one of a predetermined cone angle, numerical aperture, and F-number;
a spatially-dependent, angular light modulator (ALM) having a plurality of pixels, each of the plurality of pixels having one input pupil and N diffraction order pupils, the ALM positioned such that the output beam is incident on the plurality of pixels, wherein the N diffraction order pupils are elongated;
wherein the at least one of the predetermined cone angle, numerical aperture, and F-number of the illumination shaping optic elements prevents contaminating light from entering an incorrect pupil;
a processor coupled to the ALM to provide discrete diffraction-based beam steering, whereby the ALM projects into one or more diffraction orders at one time.

18. A light projection system, comprising:
a light source configured to provide a homogenous output beam of light;
illumination shaping optic elements configured with at least one of a predetermined cone angle, numerical aperture, and F-number;
a spatially-dependent, angular light modulator (ALM) having a plurality of pixels, each of the plurality of pixels having one input pupil and N diffraction order pupils, the ALM positioned such that the output beam is incident on the plurality of pixels, wherein the N diffraction order pupils are rectangular;
wherein the at least one of the predetermined cone angle, numerical aperture, and F-number of the illumination shaping optic elements prevents contaminating light from entering an incorrect pupil;
a processor coupled to the ALM to provide discrete diffraction-based beam steering, whereby the ALM projects into one or more diffraction orders at one time.

19. A light projection system, comprising:
a light source configured to provide a homogenous output beam of light;
illumination shaping optic elements configured with at least one of a predetermined cone angle, numerical aperture, and F-number;
a spatially-dependent, angular light modulator (ALM) having a plurality of pixels, each of the plurality of pixels having one input pupil and N diffraction order pupils, the ALM positioned such that the output beam is incident on the plurality of pixels, wherein the ALM projects into only one diffraction order at one time;

wherein the at least one of the predetermined cone angle, numerical aperture, and F-number of the illumination shaping optic elements prevents contaminating light from entering an incorrect pupil;

a processor coupled to the ALM to provide discrete diffraction-based beam steering, whereby the ALM projects into one or more diffraction orders at one time.

* * * * *